US006752449B1

(12) United States Patent
Wheatley

(10) Patent No.: US 6,752,449 B1
(45) Date of Patent: Jun. 22, 2004

(54) ROLL UP TONNEAU COVER SYSTEM

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 10/331,711

(22) Filed: Dec. 30, 2002

(51) Int. Cl.[7] .................................................. B60P 7/02
(52) U.S. Cl. .............................. 296/100.17; 296/100.18
(58) Field of Search ....................... 296/100.17, 100.18, 296/100.12, 98

(56) References Cited

U.S. PATENT DOCUMENTS

| | | | |
|---|---|---|---|
| 2,465,621 A | | 3/1949 | Wheeler |
| 3,146,824 A | | 9/1964 | Veilleux |
| 3,201,171 A | | 8/1965 | Wickard |
| 4,036,521 A | | 7/1977 | Clenet |
| 4,272,119 A | | 6/1981 | Adams |
| 4,563,034 A | | 1/1986 | Lamb |
| 4,730,866 A | | 3/1988 | Nett |
| 4,757,854 A | | 7/1988 | Rippberger |
| 4,838,602 A | | 6/1989 | Nett |
| 5,076,338 A | | 12/1991 | Schmeichel et al. |
| 5,174,353 A | | 12/1992 | Schmeichel et al. |
| 5,251,951 A | | 10/1993 | Wheatley |
| 5,322,336 A | * | 6/1994 | Isler .................. 296/100.1 |
| 5,906,407 A | | 6/1999 | Schmeichel |
| 6,293,608 B1 | | 9/2001 | Dicke et al. |
| 6,575,520 B1 | | 6/2003 | Spencer |

OTHER PUBLICATIONS

Owner's Manual—Truxedo® 2001 "The Classy Cover For Your Pickup Box", Genuine Shur–Co, Jul. 16, 2001, http://www.truxedo.com, 8 pages.

* cited by examiner

Primary Examiner—Joseph D. Pape
(74) Attorney, Agent, or Firm—Harness, Dickey & Pierce, P.L.C.

(57) ABSTRACT

A tonneau system for a cargo box of a vehicle including a support frame, a cover spanning the support frame; and a clamp. The support frame includes side rails having an inboard section and an outboard section, such that the outboard section is positioned adjacent to the top surface of the sidewall of the cargo box to aid in the supporting and positioning of the support frame. The clamp is capable of hanging from the support frame during installation to improve the ease thereof. The clamp also includes a pair of members being positionable in any one of a plurality of discrete positions for improved installation. A front rail adjustment mechanism permits the selective tensioning of the cover to maintain a predetermined load therein. While a front rail retaining mechanism is slidably coupled to the front rail member to prevent the front rail member from being inadvertently disengaged from the side rail members. A rear rail retaining mechanism is used to lock the rear rail member or unlock the rear rail member and urge the rear rail member upward.

8 Claims, 4 Drawing Sheets

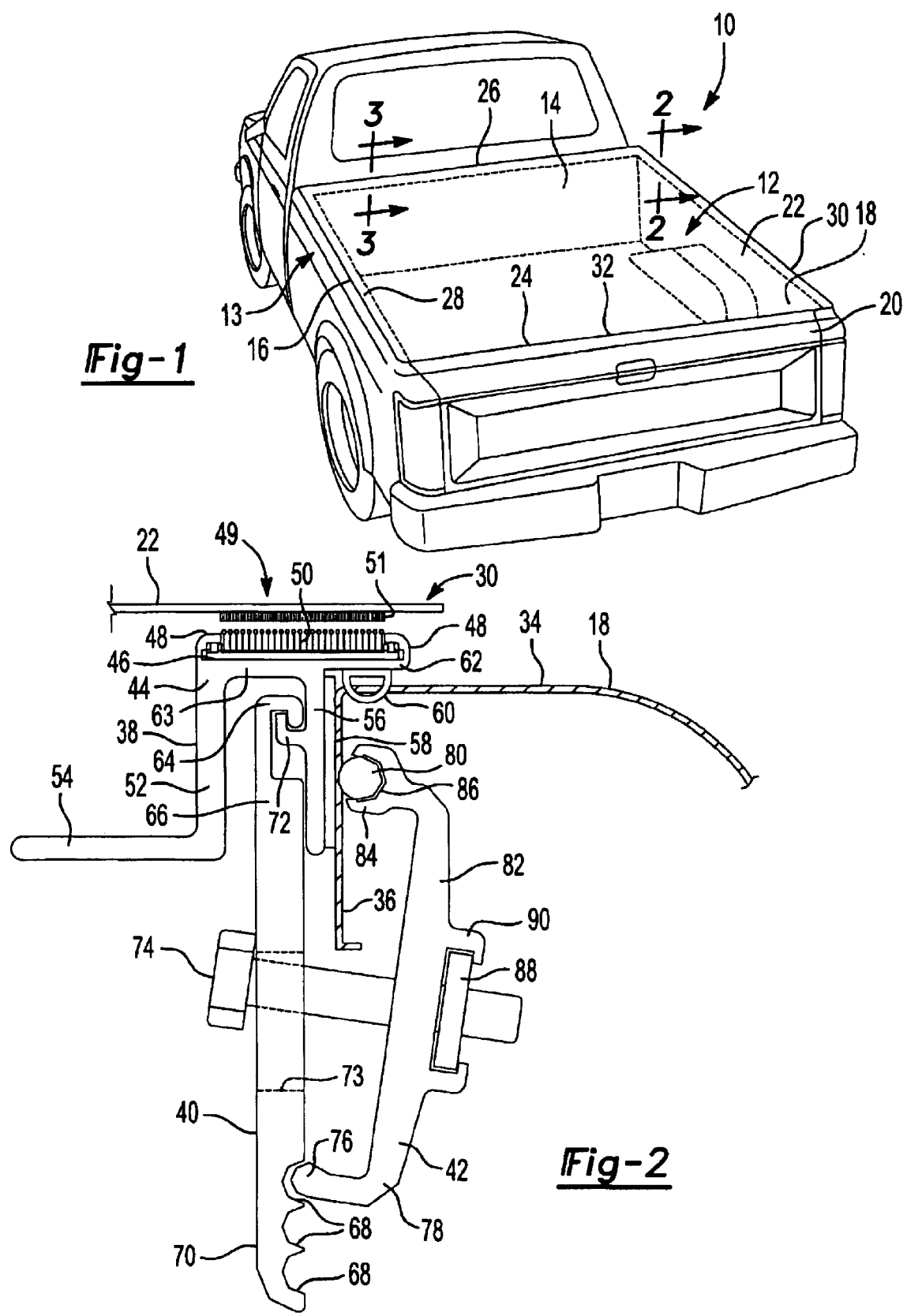

ROLL UP TONNEAU COVER SYSTEM

FIELD OF THE INVENTION

The present invention generally relates to coverings for pickup trucks and, more particularly, relates to a roll up tonneau cover system.

BACKGROUND OF THE INVENTION

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle, often led to corrosion around the snaps, and occasionally failed to protect the cargo box.

However, in the '70's, in an attempt to overcome the corrosion around the snaps, tonneau rails were removably mounted to the cargo box of the pickup truck using clamps. These tonneau rails carried the aforementioned snaps and, thus, eliminated the need to mount the snaps directly to the walls of the cargo box.

With the advent of the VELCRO® hook-and-loop fastening system, tonneau cover systems were developed that included gluing one of the hook or loop strips to the pickup truck and sewing the other strip to the fabric tonneau cover material to effect a simple connection without altering the vehicle body. An example of this system is shown in U.S. Pat. No. 4,272,119, issued to Adams. The disclosure of which is hereby incorporated and made a part of this application by reference. However, the tonneau cover of Adams had a problem remaining attached near the front of the cargo box, most likely due to wind forces. This problem was overcome using a rod of stiff rope or fiberglass sewn into a flap along the front of the tonneau cover. This rod was received within a channel having a "bite" mounted near the front of the cargo box to retain the tonneau cover in an attached position.

Rotating rails were later developed to fasten and tighten a tonneau cover. One such system employed two side rails running longitudinally down the sides of the cargo box of the pickup vehicle. A second rail was pivotally attached to each of the two side rails and carried the fabric tonneau cover such that upon downward rotation of the second rails, the fabric tonneau cover was pulled tight. The second rails were then locked in connection with the side rails. This system further included VELCRO® fasteners along the front and rear edges and a zipper for separating left and right-halves. An example of this system can be seen in U.S. Pat. No. 4,036,521, issued to Clenet. The disclosure of which is hereby incorporated and made a part of this application by reference.

Similar to the above system, a tongue and groove connector system is also known for detachably fastening a stretchable fabric panel to a rigid frame. The tongue and groove connector system included a tongue-forming element attached along a line intermediate the side edges thereof to the stretchable fabric panel. The tongue being insertable into a groove with a projecting portion extending there beyond which defines a handhold. The connection requires the fabric to be stretched to a point where the leading edge of the tongue lies adjacent the entryway into the groove such that the stretched fabric pulls the tongue into seated relation in the bottom of the groove. An example of this system can be seen in U.S. Pat. No. 4,757,854, issued to Rippberger. The disclosure of which is hereby incorporated and made a part of this application by reference.

Similarly, the convertible boot cover for the 1980 FORD® Mustang includes a trim strip around a boot having a slot for inserting a polymer tongue that is sewn to the cover. The tongue is toggled into the slot providing an attachment for the cover. This attachment is similar to that of Rippberger '854.

Further development of tonneau systems led to the use of 45° angled frame rails to improve the aesthetic quality of the tonneau cover. The angled frame rails carried a snap connector for retaining the tonneau cover material. Often, these systems included a double layer of tonneau cover material in the region of the snaps for added reinforcement. Such systems also included a clamp system for coupling with the sidewalls of the cargo box. One such clamp system used a clamp that "bottomed out" to prevent over stressing the sidewalls of the cargo box. Examples of these systems can be seen in U.S. Pat. Nos. 4,730,866 and 4,838,602, issued to Nett. The disclosures of which are hereby incorporated and made a part of this application by reference.

Many of these previous features were incorporated in later designs with slight modifications. For example, U.S. Pat. No. 5,076,338, similar to U.S. Pat. No. 4,036,521, employed a pivoting rail to tighten the tonneau cover material. In this particular system, an "L" shaped rail, which presumably puts the pivot lower for added mechanical advantage, was used to tighten the tonneau cover material from a fore and aft position, rather than crosscar position. This system further employed the 45° angled -frame rails and VEL-CRO® fasteners. The frame rails are coupled to the sidewalls of the cargo box using a plurality of C-clamps. Furthermore, the system included a double layer of tonneau cover material in the region of the snaps for added reinforcement as seen in previous designs.

In a more recent design, a rotating rear rail was provided that included positioning the pivot near the upper surface of the tonneau to minimize torque exerted on the rear rail. The lower torque of this system permitted the use of relatively lightweight plastic levers to lock the rear rail and prevent it from rotating. The combination of the length of these plastic levers and high pivot locations enabled the loads exerted on the levers to be about $\frac{1}{12}$th that of the tonneau cover material. Springs were also taught that enabled the automatic tensioning of the tonneau cover material. An example of this system can be seen in commonly owned U.S. Pat. No. 5,251,951, issued to Wheatley. The disclosure of which is hereby incorporated and made a part of this application by reference.

Relatively recently, a tonneau cover system having a screw adjustment mechanism was developed for permitting the fore and aft adjustment of the front rail. This screw adjustment mechanism serves to tighten the tonneau cover material in response to wear and/or stretch that is common in tonneau cover systems. The tonneau cover system further employed the "L" shaped lever and lower-positioned pivot, which unfortunately requires the lever to carry an enormous amount of force. That is, by way of example, assuming a 1" thick rail with a ½" offset to the latching pivot, a 30-pound tarp load. will impart a 60-pound load on the lever. Consequently, a stronger latch is required to overcome these loading forces and minimize wear and breakage. Frame rails are coupled to the sidewalls of the cargo box using a plurality of C-clamps. An example of this system can be seen in U.S. Pat. No. 5,906,407, issued to Schmeichels. The disclosure of which is hereby incorporated and made a part of this application by reference.

A TRUXEDO cover, which is not believed to be patented., made by SHURCO includes a rotating, rectangular, rear rail having a rounded front pivot, vertical sides with VELCRO® attachment, and spring pins that push on a front- rail mounted inboard of the side rails. These spring pins push against the front rail to tension the system in the fore-aft direction. The spring pins, which are attached to the side rails via brackets, may not firmly engage the front rail due to their inboard location which may cause the brackets to come out of alignment as the side rails rotate. Additionally, the rounded shape of the front rails may cause the push pins to slip off-center.

Lastly, U.S. Pat. No. 6,293,608, issued to Dicke, et al., discloses a tailgate rail interconnected to side rails with an interconnecting plate fixedly coupled to the side rails and slideably coupled to the corner piece for accommodating relative movement therebetween. A biasing device, being a coil spring, is further provided. This system provides tensioning to the tonneau fabric.

SUMMARY OF THE INVENTION

According to the principles of the present invention, a tonneau system for a cargo box of a vehicle having an advantageous construction is provided. The tonneau cover system includes a support frame, a cover spanning the support frame, and a clamp. The support frame includes side rails having an inboard section and an outboard section, such that the outboard section is positioned adjacent to the top surface of the sidewall of the cargo box so as to aid in the supporting and positioning of the support frame. The clamp is capable of hanging from the support frame during installation to improve the ease thereof. The clamp also includes a pair of members being positionable in any one of a plurality of discrete positions for improved installation. A front rail adjustment mechanism permits the selective tensioning of the cover to maintain a predetermined load therein. While a front rail retaining mechanism is slidably coupled to the front rail member to prevent the front rail member from being inadvertently disengaged from the side rail members. A rear rail retaining mechanism is used to lock the rear rail member or unlock the rear rail member and urge the rear rail member upward.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view illustrating a pickup truck having a tonneau cover system according to the principles of the present invention;

FIG. 2 is a cross sectional view illustrating the frame rail assembly taken along line 2—2 of FIG. 1;

DETAILED DESCRIPTION OF THE PREFERRED EMBODIMENTS

Figure 3:
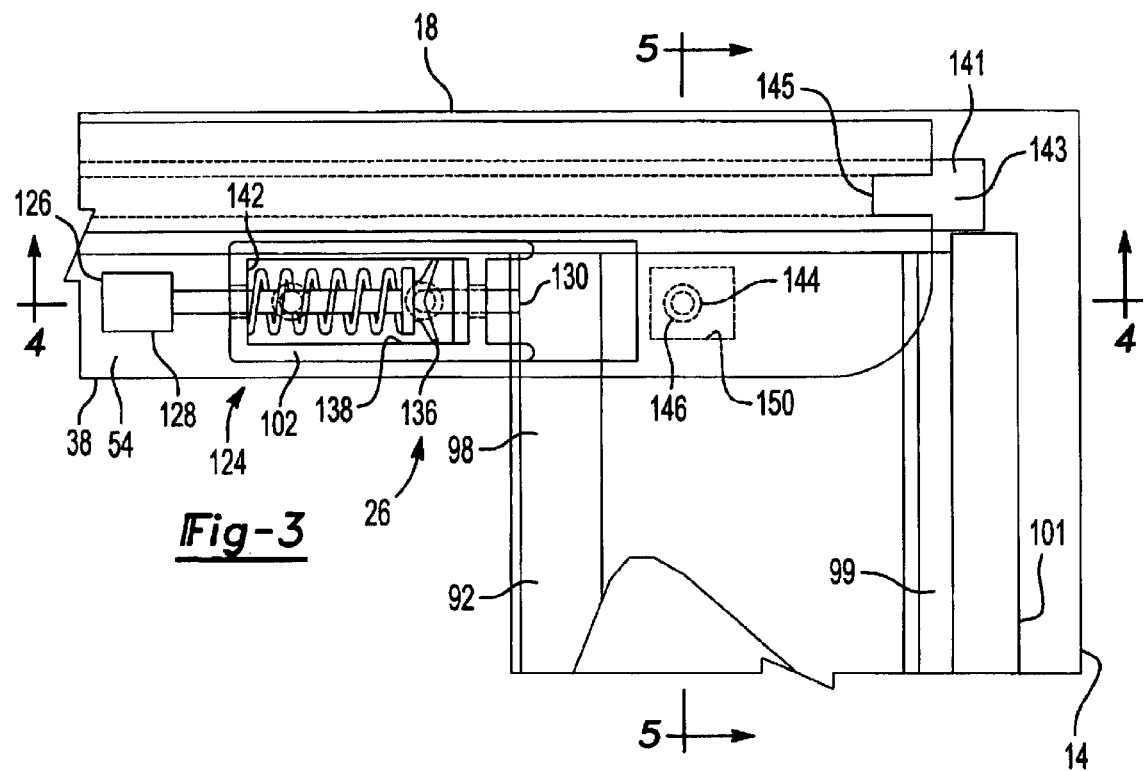
FIG. 3 is a plan view illustrating the front rail member and frame rail assembly.

The following description of the preferred embodiments is merely exemplary in nature and is in no way intended to limit the invention, its application, or uses.

With reference to FIG. 1, a pickup truck 10 is shown having a roll up roll up tonneau system 12 which is attached to a cargo box 13 according to the present invention. Cargo box 13 has a front wall 14, a left sidewall 16, a right sidewall 18, and a rear wall or tailgate 20. Roll up roll up tonneau system 12 includes a flexible, stretchable fabric cover 22 that is drawn tightly over a substantially rigid rail support system 24 and removably attached to rail support system 24. Rail support system 24 is comprised of a number of frame rails that are attached to one another to form a rectangular frame. The frame rails included are a front frame rail or head rail assembly 26, a left side frame rail assembly 28, a right side frame rail assembly 30, and a rear frame rail assembly 32. Rail support system 24 is aligned with the top of sidewalls 16 and 18 of cargo box 13 as well as the top of front wall 14 and tailgate 20.

It should be understood that right sidewall 18 and left sidewall 16 of pickup truck 10 and the corresponding right side frame rail assembly 30 and left side frame rail assembly 28 are identical in construction, yet arranged in mirrored symmetry. Accordingly, in the interest of brevity, only one side will be discussed in detail below unless noted otherwise.

As best seen in FIG. 2, right side frame rail assembly 30 is coupled to right sidewall 18 of cargo box 13 of pickup truck 10. As can be seen, sidewall 18 of cargo box 13 includes a generally horizontal top surface 34 and a downwardly extending inside wall 36. However, it should be appreciated that generally horizontal top surface 34 and downwardly extending inside wall 36 may have any one of a number of configurations, which are dependent upon styling and functionality determined by the vehicle manufacturer. Hence, it should be understood that the particular shape of these surfaces/walls may vary, along with the specific shape of those corresponding components of frame rail assembly 30.

Still referring to FIG. 2, frame rail assembly 30 generally includes a support bracket 38, a hanging side member 40, and a back member 42. Support bracket 38 includes a first horizontal portion 44 having a channel 46 formed therein.

Channel 46 is generally defined by a pair of upturned and inwardly projecting flanges 48. Channel 46 is sized to receive one of a cooperating pair of strips of a hook-and-loop fastener system 49—that is, a first strip 50 of the pair is disposed in channel 46 and the corresponding second strip 51 of the pair is mounted on fabric cover 22. Preferably, the hook-and-loop fastener system is made of VELCRO®. However, it should be understood that alternate suitable fasteners may be used, such hook and hook material, other self-adhesive material, magnetic tape on steel, tongue and groove, and the like. Frame rail assembly 30 further includes a downwardly extending portion 52 that terminates into a second horizontal portion 54. Second horizontal portion 54 is adapted to support an adjustment mechanism that will be discussed in detail below.

With continued reference to FIG. 2, frame rail assembly 30 still further includes a second downwardly extending portion 56 extending from an intermediate section of first horizontal portion 44 generally adjacent inside wall 36 of sidewall 18. Second downwardly extending portion 56 receives a flat seal 58 preferably adhesively coupled thereto. Flat seal 58 is adapted to engage inside wall 36 of sidewall 18 to define a fluid sealing connection therebetween. Flat seal 58 may be made of any suitable material that would at least inhibit inflow of water, dirt, debris, or other environmental contaminants.

To further prevent the influx of water, dirt, debris, or other environmental contaminants from entering cargo box 13 through the interface between support bracket 38 and sidewall 18, a second seal 60 is provided. Specifically, as can be seen in FIG. 2, first horizontal portion 44 extends outboard such that an overlapping outboard section 62 overlaps a portion of top surface 34 of sidewall 18 while an inboard section 63 cantilevers inward into cargo box 13. Second seal 60 is preferably D-shaped and extends downwardly from overlapping outboard section 62 such that second seal 60 compressibly engages top surface 34 of sidewall 18.

The overlap of overlapping outboard section 62 relative to top surface 34 provides a number of useful advantages over the prior art. Specifically, such overlapping relationship between support bracket 38 and sidewall 18 defines a positive positioning reference during installation of roll up tonneau system 12. Additionally, the weight exerted on support bracket 38 causes second seal 60 to be further compressed against top surface 34 of sidewall 18, thereby further ensuring a reliable sealing connection. Still further, the use of flat seal 58 and second seal 60 provide a double sealing connection along both horizontal and vertical surfaces. Unlike the prior art that seals only along a vertical surface, the present invention does not readily permit water to lie upon the vertical sealing surface, which considerably improves the sealing characteristics.

Turning now to the clamping system of the present invention, hanging side member 40 and back member 42 cooperate to retain support bracket 38 to sidewall 18. In particular, hanging side member 40 is shown being generally planar in construction with a hooked flange 64 formed on an upper end 66 and a series of alignment depressions 68 formed on an opposing end 70. Hooked flange 64 is sized to cooperate with a corresponding flange 72 extending upwardly from second downwardly extending portion 56 so that hanging side member 40 can hang from second downwardly extending portion 56 during installation. Hanging side member 40 further includes an aperture 73 formed therein to receive at least one fastener 74.

Back member 42 is shown being generally U-shaped in construction having an alignment head 76 formed on a lower end 78 and an engaging head 80 formed on an upper end 82. Alignment head 76 is preferably curved in shape and sized to be received within one of the series of alignment depressions 68. Engaging head 80 preferably includes a pair of outwardly extending flanges 84 adapted to retain a contact member 86. Contact member 86 is preferably made of a soft rubber material to prevent damage to inside wall 36 of sidewall 18. However, contact member 86 is optional and, thus, may be eliminated or replace with other material. Still further, back member 42 includes a retaining nut 88 that cooperates with fastener 74 to apply a clamping force upon inside wall 36 of sidewall 18 to retain support bracket 38 in position. Retaining nut 88 is preferably held by retaining flanges 90, which serve to hold retaining nut 88 in position and fixed against rotation. However, it should be understood that other fastener systems may be used, such as a quick release clamping mechanism or other known means.

During clamping, back member 42 is first loosely fastened to hanging side member 40 via fastener 74 and retaining nut 88. Hanging side member 40 is then conveniently inserted such that hooked flange 64 engages corresponding flange 72 to permit hanging side member 40 and back member 42 to hanging from such position. By maintaining hanging side member 40 and back member 42 in a loosely fitting arrangement, back member 42 may be positioned along a backside of inside wall 36. Back member 42 may also be positioned vertically relative to hanging side member 40 by moving alignment head 76 into one of the series of alignment depressions 68, thereby adjusting the position of contact member 86 upon inside wall 36. In order to facilitate such adjustment, it can be seen that aperture 73 formed in hanging side member 40 is preferably a slot to permit the vertical translation of fastener 74 relative to hanging side member 40. Fastener 74 is then tightened to apply a clamping force upon inside wall 36 to retain support bracket 38 in position and further compress flat seal 58. It should be appreciated that the present arrangement simplifies installation of roll up tonneau system 12 in that the clamping mechanism need not be held in place by a user with one hand while simultaneously tightening fastener 74 with the other hand, as required in the prior art. Additionally, due to the hanging feature of hanging side member 40 and overlapping outboard section 62 of first horizontal portion 44, frame rail assembly 30 can not be easily removed from pickup truck 10 nor will the clamping mechanism fall out of position or tonneau cover 22 drop down should fastener 74 become loosened.

Turning now to FIGS. 3–6, head rail assembly 26 will now be discussed in detail. As best seen in FIG. 3, head rail assembly 26 generally includes a forward rail member 92 that extends in the cross-car direction generally in plane with front wall 14 of cargo box 13. Forward rail member 92 receives an attachment member 94 coupled to fabric cover 22 within a receiving channel 96 formed in an upper surface of forward rail member 92 to define the forward edge of coverage of roll up tonneau system 12. Receiving channel 97 formed in forward rail member 92 receives a bulbous seal 99 that has a first portion 105 disposed in receiving channel 97, a second D-shaped portion 103 coupled to first portion 105, and a downwardly biased, curved wiper seal 101 that engages the top of front wall 14 to providing a sealing engagement therebetween. Forward rail member 92 is preferably hollow to minimize weight and generally rectangular in cross section. At an end opposing receiving channel 96, forward rail member 92 includes a generally curved portion 98. Generally curved portion 98 is adapted to engage a corresponding curved channel 100 disposed at a forward end of an adjustment support bracket 102. A recess 104 is formed above generally curved portion 98 on forward rail member 92 to prevent interference with a protruding flange 106 extending from adjustment support bracket 102. Accordingly, when fabric cover 22 is installed above rail support system 24, generally curved portion 98 of forward rail member 92 may be inserted into curved channel 100 in an inclined position and then rotated forward relative to the vehicle into the illustrated lowered position. During this movement, generally curved portion 98 smoothly rotates with curved channel 100.

Figure 4:
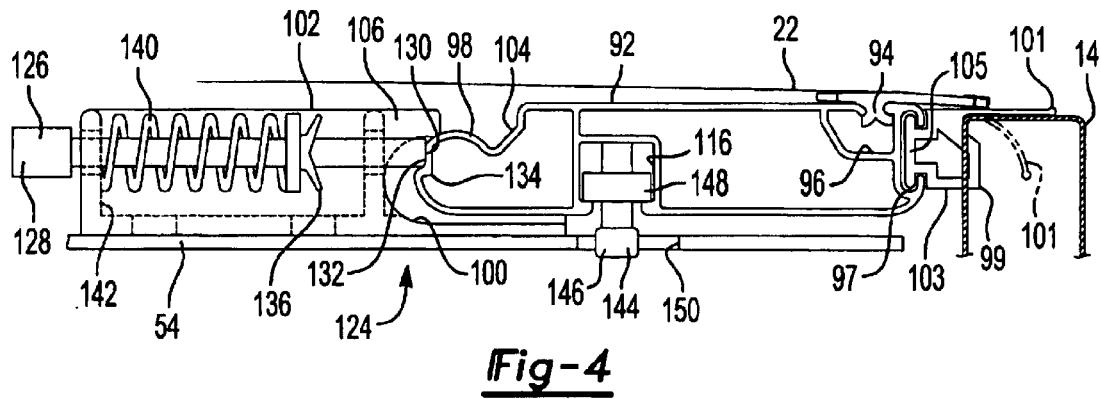
FIG. 4 is a partial cross sectional view illustrating the front rail member and frame rail assembly taken along line 4—4 of FIG. 3.
Figure 5:
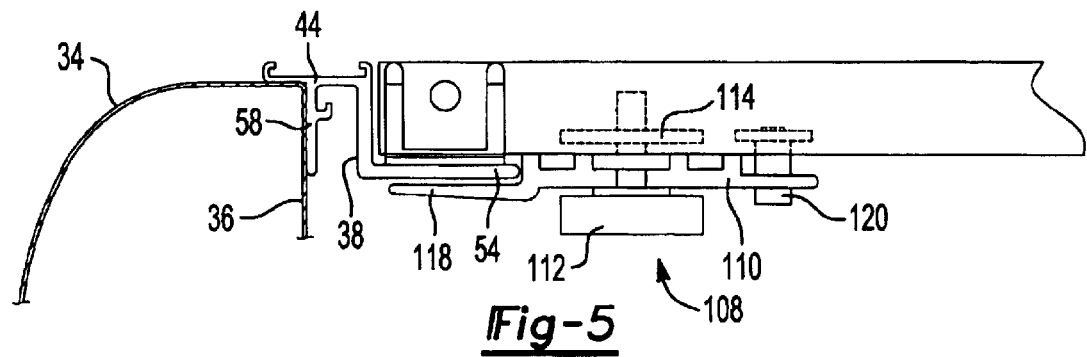
FIG. 5 is a partial cross sectional view illustrating the front rail member and frame rail assembly taken along line 5—5 of FIG. 3.
Figure 6:
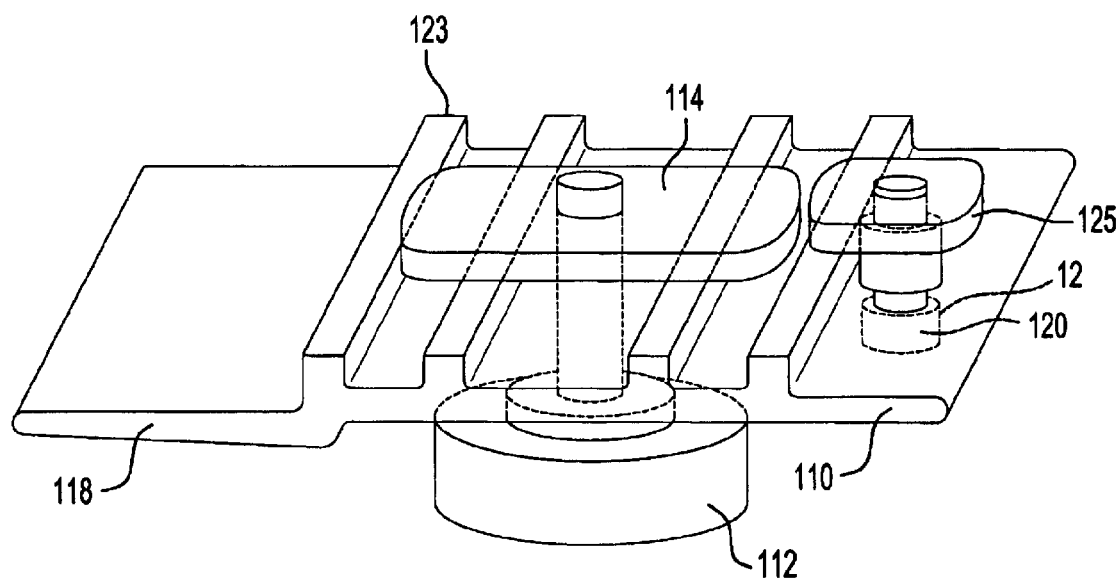
FIG. 6 is a perspective view illustrating the retaining mechanism.

As best seen in FIGS. 5 and 6, in order to retain forward rail member 92 in this lowered position, a retaining mechanism 108 is provided. Retaining mechanism 108 includes a latch member 110 slidably coupled to forward rail member 92 via a fastener 112, such as a thumb screw, and nut 114, such as an elongated nut or T-nut. Nut 114 is slidably retained with a lower C-shaped channel 116 (FIG. 4) extending along an underside of forward rail member 92. Latch member 110 includes a cantilevered portion 118 adapted to be positioned adjacent an underside of second horizontal portion 54 of support bracket 38 to prevent the removal of forward rail member 92 relative to support bracket 38. Retaining mechanism 108 further includes a guide locator 120 having a screw 122 retaining a fixed locator 125. It should be understood that guide locator 120 may be made integral with latch member 110. Lastly, a plurality of steps 123 are disposed along the upper side of latch member 110 to provide the necessary spacing of cantilevered portion 118 from second horizontal portion 54.

Referring again to FIGS. 3 and 4, an adjustment mechanism 124 is provided for engagement with forward rail member 92 to selectively position forward rail member 92 in a further fore or aft position to adjust the tightness of fabric cover 22. This preferred position of forward rail member 92 may vary depending upon installation, age of fabric cover 22, environment temperatures and moisture levels, and the like. To effect such adjustment, adjustment mechanism 124 includes adjustment support bracket 102 that is fixedly coupled via conventional methods to second horizontal portion 54 of support bracket 38. Adjustment support bracket 102 is generally box-shaped having protruding flanges 106 extending from a forward end thereof.

Adjustment support bracket 102 further includes an adjustment bolt 126 having a head portion 128 and an engaging portion 130. Head portion 128 extends beyond an aft end of adjustment support bracket 102, while engaging portion 130 engages forward rail member 92. Specifically, engaging portion 130 engages a generally flat portion 132 formed in curved portion 98 to mate with engaging portion 130 of adjustment bolt 126. It should be noted that generally flat portion 132 might include a lower edge 134 that is held by engaging portion 130 of adjustment bolt 126, which aids in retaining forward rail member 92 in a lowered position.

Adjustment mechanism 124 further includes a nut 136, which is preferably a wing nut having wings that engage interior side surfaces 138 of adjustment support bracket 102 to prevent nut 136 from rotating relative to adjustment support bracket 102. A spring 140 extends between nut 136 and an interior end surface 142 of adjustment support bracket 102 to providing a biasing force against nut 136. The length of spring 140 is chosen such that the shrinkage or expansion with temperature of fabric cover 22 will not cause the spring force to vary greatly, thus maintain the tension in fabric cover 22 nearly constant. Accordingly, as adjustment bolt 126 is driven inward (forward), engaging portion 130 is driven in contact with generally flat portion 132 of forward rail member 92, thereby driving forward rail member 92 forward. Further forward displacement of forward rail member 92, and corresponding fabric cover 22, continue until the tension in fabric cover 22 generally equals the biasing force of spring 140. Therefore, according to the present arrangement, fabric cover 22 is ensured to remain taut, even during environment temperature and moisture changes and age. However, should further adjustment of fabric cover 22 be necessary, adjustment bolt 126 may simply be further driven forward.

Although, as seen in FIGS. 3 and 4, an adjustment limit 144 may be used to prevent excessive adjustment of forward rail member 92 in either the fore or aft direction. To this end, adjustment limit 144 includes a bolt 146 coupled to a nut 148 disposed in lower channel 116 of forward rail member 92. Bolt 146 downwardly extends and is received with an aperture 150 formed in second horizontal portion 54 of support bracket 38. By way of non-limiting example, it is anticipated that adjustment limit 144 would limit the adjustment of forward rail member 92 to within about 1" of fore and aft movement. Furthermore, aft movement is limited by the interface between curved portion 98 and corresponding curved channel 100. Adjustment limit 144 prevents forward rail member 92 from sliding forward when fabric cover 22 is rolled up into a forward open position at the front of cargo box 13. When fabric cover 22 is in the closed position, the combination of biasing force from spring 140 and inherent tension within fabric cover 22 maintains adjustment limit 144 and forward rail member 92 in proper position.

As best seen in FIG. 3, each support bracket 38 preferably receives a pair of bumper members 141 disposed on opposing ends of support bracket 38 in a space defined by first downwardly extending portion 52, a portion of first horizontal portion 44, and second downwardly extending portion 56. Bumper member 141 preferably has a plurality of retaining ridges 143 to engage first downwardly extending portion 52, a portion of first horizontal portion 44, and second downwardly extending portion 56 to maintain bumper member 141 within the aforementioned space. Each of the pair of bumper members 141 includes a head portion 143 and a base portion 145. Head portion 143 engages front wall 14 or tailgate 20, while base portion 145 is received in the defined space. Once installed, bumper members 141 engage front wall 14 or tailgate 20 of pickup truck 10 and act to align, maintain, and hold support bracket 38 and, thus frame rail assembly 30 in a generally centered fore-aft position. Furthermore, bumper members 141 further serve to properly position seals 103 and 161 relative to front wall 14 and tailgate 20, respectively.

Figure 7:
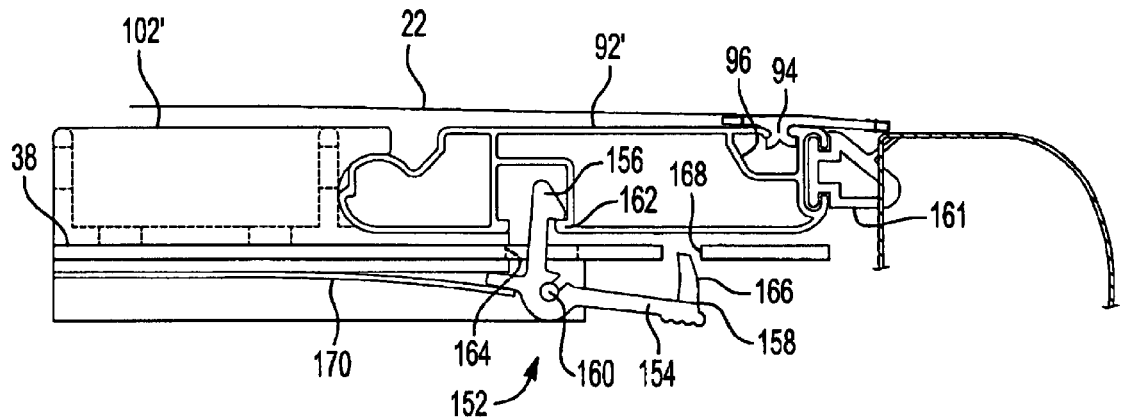
FIG. 7 is a partial cross sectional view illustrating the rear rail member and frame rail assembly shown in a locked position.
Figure 8:
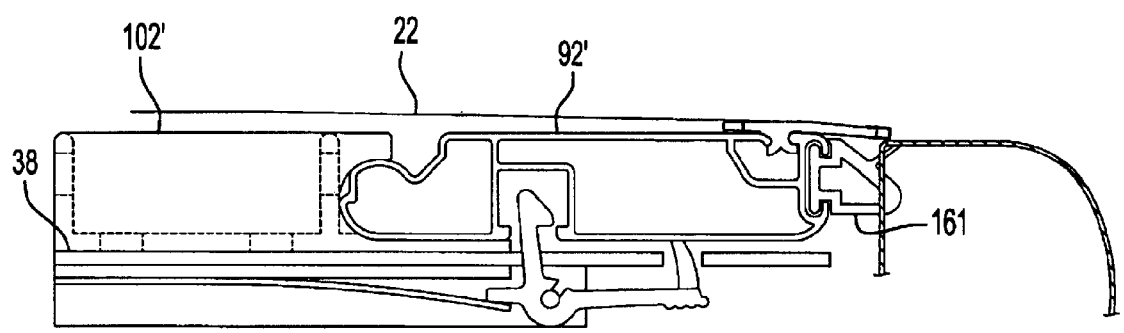
FIG. 8 is a partial cross sectional view illustrating the rear rail member and frame rail assembly shown in an intermediate position.
Figure 9:
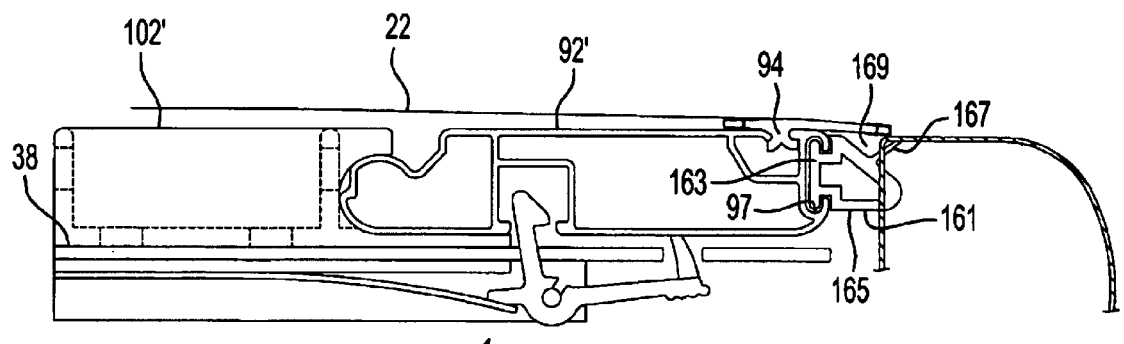
FIG. 9 is a partial cross sectional view illustrating the rear rail member and frame rail assembly shown in an unlocked and upwardly urged position.

Turning now to FIGS. 7–9, a rear latching mechanism 152 will be described in detail. As can be seen in the figures, rear latching mechanism 152 shares a number of parts with head rail assembly 26. In particular, rear latching mechanism 152 includes the aforementioned forward rail member 92, referenced as rear rail member 92' hereinafter, and adjustment support bracket 102, referenced as support bracket 102' hereinafter. It should be appreciated that such use of members in multiple locations within roll up tonneau system 12 provides a number of manufacturing and assembly efficiencies. In the interest of brevity, specific reference and explanation of components shared between head rail assembly 26 and rear frame rail assembly 32 will not be discussed.

With particular reference to FIG. 7, rear-latching mechanism 152 includes support bracket 102' being coupled to support bracket 38 via conventional means, such as fasteners. Rear rail member 92' receives attachment member 94 coupled to fabric cover 22 within receiving channel 96 formed in rear rail member 92' to define the rear edge of coverage of roll up tonneau system 12. Rear latching mechanism 152 still further includes a latching pawl 154. Latching pawl 154 is generally L-shaped having a latching hook 156, a trigger/ejector head 158, and a centrally located pivot 160. Latching hook 156 is shaped to selectively engage a flange 162 extending within C-shaped lower channel 116. Latching hook 156 extends through an aperture 164 formed in second horizontal portion 54 of support bracket 38. Aperture 164 is equidistant from an end of support bracket 38 compared to aperture 150 to permit support bracket 38 to be used on either a left or right side of cargo box 13. Trigger/ejector head 158 is positioned near a rear end of rear rail member 92' to permit easy actuation by a user. Trigger/ejector head 158 includes a protrusion 166, which may extend through an aperture 168 to engage and translate rear rail member 92' upward to signal to a user that rear rail member 92' has been sufficiently unlatched. It should be understood that the length of trigger/ejector head 158 from pivot 160 may be increased relative to the length of latching hook 156 from pivot 160 for increase mechanical advantage. Rear latching mechanism 152 further includes a spring 170 biasing latching hook 156 in an engaged and locked position.

As seen in FIGS. 7–9, as trigger/ejector head 158 is depressed in a counter-clockwise direction, trigger/ejector head 158 pivots upward about pivot 160. Such rotation disengages latching hook 156 from flange 162. Continued depression of trigger/ejector head 158 causes trigger/ejector head 158 to engage an underside of rear rail member 92', thereby pivoting rear rail member 92' about curved portion 98. Rear rail member 92' may then be removed from support bracket 102'.

Receiving channel 97 formed in rearward rail member 92' receives a bulbous seal 161 that has a first portion 163 slidable disposed in receiving channel 97, a second D-shaped portion 165 coupled to first portion 163, and an upwardly inclined wiper seal 167 that engages the side of tail gate 20 to provide a sealing engagement therebetween. Upwardly inclined wiper seal 167 and second portion 165 cooperate to form a channel 169 to collect and direct water outwardly.

Following disengagement of rear latching mechanism 152, rear rail member 92' may be rolled forward to gather fabric cover 22 at a forward location. To this end, it should be appreciated that the generally horizontally disposed hook-and-loop fastener system 49, unlike prior art configurations, provides a simple "peel-off/on" arrangement in a direction perpendicular to the attachment plane of hook-and-loop fastener system 49. Prior art systems often require additional layers of vinyl to separate the VELCRO® strips prior to attachment. Additionally, other prior art systems require a shearing action in order to disengage the VELCRO® strips. These systems require additional complexity to attach and additional force to separate and further limit the life of the VELCRO® strips. The "peel-off/on" arrangement of the present invention in a direction of perpendicular to the attachment plane provides improved simplicity in engagement and disengagement of hook-and-loop fastener system 49 and further improves the useful life thereof. This gentle action further permits the present invention to use aggressive hook-and-loop fastener systems that do not require them to be pushed into place; however, they are loaded in shear by fabric cover 22 yet may be released with a gentle peeling action. It should be appreciated that hook-and-loop fastener system 49 of the present invention is disengaged by a simple rolling of fabric cover 22 to its forward position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tonneau system for a cargo box of a vehicle, said cargo box having a front wall and a tailgate, said tonneau system comprising:

a support frame having a side rail and a front rail;

a cover spanning said support frame; and a pair of bumper members disposed on opposing ends of said side rail, one of said pair of bumper members being engageable with the front wall of the cargo box and the other of said pair of bumper members being engageable with the tailgate of the cargo box, said pair of bumper members cooperating to align said side rail in a predetermined fore and aft position.

2. The tonneau system according to claim 1, further comprising:

a plurality of retaining ridges disposed along at least a portion of each of said pair of bumper members, said plurality of retaining ridges operable to engage at least a part of said side rail for retaining each of said pair of bumper members in connection with said side rail.

3. The tonneau system according to claim 1 wherein each of said pair of bumper members comprises:

a head portion engagable with at least one of the front wall of the cargo box and the tailgate; and a base portion receivable within said side rail.

4. The tonneau system according to claim 1, further comprising:

a seal member disposed along said front rail; said pair of bumper member sperable to maintain said seal member in proper sealing engagement.

5. A tonneau system for a cargo box of a vehicle, said cargo box having a front wall and a tailgate, said tonneau system comprising:

a support frame having a longitudinal rail and a traverse rail;

a cover spanning said support frame; and a bumper member disposed on an end of said longitudinal rail, said bumper member being engagable with the cargo box, said bumper member aligning said longitudinal rail in a predetermined fore and aft position.

6. The tonneau system according to claim 5, further comprising:

a plurality of retaining ridges disposed along at least a portion of said bumper member, said plurality of retaining ridges operable to engage at least a part of said longitudinal rail for retaining said bumper member in connection with said longitudinal rail.

7. The tonneau system according to claim 5 wherein said bumper member comprises:

a head portion engagable with the cargo box; and a base portion receivable within said longitudinal rail.

8. The tonneau system according to claim 5, further comprising:

a seal member disposed along said traverse rail; said pair of bumper members operable to maintain said seal member in proper sealing engagement.

* * * * *